US008660885B2

(12) United States Patent
Brown et al.

(10) Patent No.: US 8,660,885 B2
(45) Date of Patent: Feb. 25, 2014

(54) DEFINING SERVICE OWNERSHIP FOR A SERVICE ORIENTED ARCHITECTURE

(75) Inventors: William A. Brown, Raleigh, NC (US); Kerrie L. Holley, Montara, CA (US); Garrison A. Moore, Uxbridge (CA); William J. Tegan, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/572,670

(22) Filed: Aug. 12, 2012

(65) Prior Publication Data
US 2012/0310710 A1 Dec. 6, 2012

Related U.S. Application Data

(63) Continuation of application No. 12/025,328, filed on Feb. 4, 2008, now Pat. No. 8,275,643.

(51) Int. Cl.
G06Q 10/00 (2012.01)

(52) U.S. Cl.
USPC .......................... 705/7.37; 705/7.13; 705/7.36

(58) Field of Classification Search
USPC ............ 705/7.11, 7.27, 7.29, 7.13, 7.37, 7.36
See application file for complete search history.

(56) References Cited

U.S. PATENT DOCUMENTS

| | | | |
|---|---|---|---|
| 5,745,878 A | 4/1998 | Hashimoto et al. | |
| 6,363,393 B1 | 3/2002 | Ribitzky | |
| 6,405,364 B1 | 6/2002 | Bowman-Amuah | |
| 6,601,233 B1 | 7/2003 | Underwood | |
| 6,640,249 B1 | 10/2003 | Bowman-Amuah | |
| 7,149,699 B2 | 12/2006 | Barnard et al. | |
| 7,580,946 B2 | 8/2009 | Mansour et al. | |
| 7,685,604 B2 | 3/2010 | Baartman et al. | |
| 7,720,198 B2 | 5/2010 | Schliermann | |
| 7,937,673 B1 | 5/2011 | Kurshan et al. | |
| 7,992,133 B1 | 8/2011 | Theroux et al. | |
| 2002/0120776 A1 | 8/2002 | Eggebraaten et al. | |
| 2002/0194053 A1* | 12/2002 | Barrett et al. | 705/10 |
| 2004/0107124 A1 | 6/2004 | Sharpe et al. | |
| 2004/0193703 A1 | 9/2004 | Loewy et al. | |

(Continued)

OTHER PUBLICATIONS

SOA Governance: Framework and Best Practices—by Mohamed Afshar An Oracle White Paper May 2007.*

(Continued)

Primary Examiner — Andre Boyce
Assistant Examiner — Ernest A Jackson
(74) Attorney, Agent, or Firm — Edward J. Lenart; John R. Pivnichny; Biggers Kennedy Lenart Spraggins LLP

(57) ABSTRACT

Defining service ownership for an SOA includes defining, in response to an event requiring a change in service ownership and in dependence upon data describing business functions within a business, a service domain. Embodiments also include reviewing the defined service domain for approval and upon approval of the defined service domain, identifying potential impact upon currently existing service domains caused by implementation of the defined service domain. Embodiments also include identifying a potential owner of the defined service domain in dependence upon a service type of the defined service domain and funding requirements of the service domain and presenting, to relevant stakeholders in the business, the potential owner of the defined service domain for approval. Upon approval of the potential owner of the defined service domain, embodiments include assigning the potential owner of the defined service domain responsibility for managing the defined service domain.

12 Claims, 3 Drawing Sheets

(56) References Cited

U.S. PATENT DOCUMENTS

| | | | |
|---|---|---|---|
| 2005/0108703 A1 | 5/2005 | Hellier | |
| 2005/0154700 A1 | 7/2005 | Lele | |
| 2005/0203784 A1 | 9/2005 | Rackham | |
| 2005/0204048 A1 | 9/2005 | Pujol et al. | |
| 2005/0222931 A1 | 10/2005 | Mamou et al. | |
| 2005/0223109 A1 | 10/2005 | Mamou et al. | |
| 2005/0232046 A1 | 10/2005 | Mamou et al. | |
| 2006/0059253 A1* | 3/2006 | Goodman et al. | 709/223 |
| 2006/0080352 A1* | 4/2006 | Boubez et al. | 707/102 |
| 2006/0155725 A1 | 7/2006 | Foster et al. | |
| 2006/0235733 A1* | 10/2006 | Marks | 705/7 |
| 2006/0241931 A1 | 10/2006 | Abu el Ata et al. | |
| 2006/0271660 A1* | 11/2006 | LaJeunesse | 709/223 |
| 2006/0277081 A1 | 12/2006 | Pham et al. | |
| 2007/0043724 A1 | 2/2007 | Senan et al. | |
| 2007/0074148 A1 | 3/2007 | Morgan | |
| 2007/0143474 A1 | 6/2007 | Sheng et al. | |
| 2007/0168753 A1 | 7/2007 | Herter et al. | |
| 2007/0209059 A1 | 9/2007 | Moore et al. | |
| 2007/0220479 A1 | 9/2007 | Hughes | |
| 2007/0244904 A1 | 10/2007 | Durski | |
| 2007/0265868 A1 | 11/2007 | Rapp et al. | |
| 2008/0028329 A1 | 1/2008 | Erl | |
| 2008/0028365 A1 | 1/2008 | Erl | |
| 2008/0040292 A1 | 2/2008 | Nakayashiki | |
| 2008/0046259 A1 | 2/2008 | Johnston | |
| 2008/0052314 A1 | 2/2008 | Batabyal | |
| 2008/0059378 A1 | 3/2008 | D'Alo et al. | |
| 2008/0065466 A1 | 3/2008 | Liu et al. | |
| 2008/0069082 A1 | 3/2008 | Patrick | |
| 2008/0069124 A1* | 3/2008 | Patrick | 370/401 |
| 2008/0126147 A1 | 5/2008 | Ang et al. | |
| 2008/0127047 A1 | 5/2008 | Zhang et al. | |
| 2008/0172269 A1 | 7/2008 | Senan et al. | |
| 2008/0172621 A1 | 7/2008 | Soroker et al. | |
| 2008/0270153 A1 | 10/2008 | Drapkin et al. | |
| 2008/0282219 A1 | 11/2008 | Seetharaman et al. | |
| 2008/0300933 A1 | 12/2008 | Britton et al. | |
| 2009/0043622 A1 | 2/2009 | Finlayson et al. | |
| 2009/0063171 A1 | 3/2009 | Isom | |
| 2009/0064087 A1 | 3/2009 | Isom | |
| 2009/0100431 A1 | 4/2009 | Doyle et al. | |
| 2009/0182565 A1 | 7/2009 | Erickson et al. | |
| 2009/0187823 A1 | 7/2009 | Farrell et al. | |
| 2009/0192867 A1 | 7/2009 | Farooq et al. | |
| 2009/0198534 A1 | 8/2009 | Brown et al. | |
| 2009/0198535 A1 | 8/2009 | Brown et al. | |
| 2009/0198537 A1 | 8/2009 | Brown et al. | |
| 2009/0198550 A1* | 8/2009 | Brown et al. | 705/9 |
| 2010/0049628 A1 | 2/2010 | Mannava et al. | |
| 2010/0071028 A1 | 3/2010 | Brown et al. | |
| 2010/0095266 A1 | 4/2010 | Novak | |
| 2010/0125477 A1 | 5/2010 | Mousseau et al. | |
| 2010/0138250 A1 | 6/2010 | Brown et al. | |
| 2010/0138251 A1 | 6/2010 | Brown et al. | |
| 2010/0138252 A1 | 6/2010 | Brown et al. | |
| 2010/0138254 A1 | 6/2010 | Brown et al. | |
| 2010/0146037 A1 | 6/2010 | Little | |
| 2010/0198730 A1 | 8/2010 | Ahmed et al. | |
| 2010/0217636 A1 | 8/2010 | Channabasavaiah et al. | |
| 2010/0305994 A1 | 12/2010 | Gaskell | |
| 2012/0066145 A1 | 3/2012 | Adhikary | |
| 2012/0066146 A1 | 3/2012 | Adhikary | |
| 2012/0066147 A1 | 3/2012 | Adhikary | |
| 2012/0066663 A1 | 3/2012 | Adhikary | |
| 2012/0066671 A1 | 3/2012 | Adhikary | |

OTHER PUBLICATIONS

Afshar, M., et al., "SOA Governance: Framework and Best Practices", An Oracle White Paper, May 2007, pp. 1-22, Version 1.1, Oracle Corporation, Redwood Shores, CA, USA.
Bass, Clements, Kazman, "Software Architecture in Practice, Second Edition", (Apr. 9, 2003), 1 page.
Bieberstein, N., et al., "Executing SOA: A Practical Guide for the Service-Oriented Architect", May 5, 2008, pp. 1-27, ibmpressbooks.com, IBM Press.
Brown, W., et al., "SOA governance: how to oversee successful implementation through proven best practices and methods", Effective governance through the IBM SOA Governance Management Method Approach White paper, pp. 1-48, Aug. 2006.
Burns, et al., "The Essentials of an SOA COE", Oct. 27, 2004, pp. 1-16, IBM Global Services.
Cherbakov, et al., "Impact of Service Orientation at the Business Level", IBM Systems Journal, Dec. 1, 2005, pp. 1-14, IBM SJ 44-4, IBM.
Durvasula, S., et al., "SOA Practitioners' Guide Part I Why Services-Oriented Architecture?", Sep. 15, 2006, pp. 1-18, URL: http://www.soablueprint.com/whitepapers/SOAPGPart1.pdf.
Erradi, A., et al., "SOAF: An Architectural Framework for Service Definition and Realization", IEEE International Conference on Services Computing (SCC'06), pp. 1-8, 2006 IEEE.
Ferguson, et al., "Service-Oriented Architecture: Programming Model and Product Architecture", IBM Systems Journal, Oct. 21, 2005, pp. 1-24, IBM SJ 44-4, IBM.
Freeland, J., "The New CRM Imperative," Ultimate CRM Handbook, McGraw-Hill, Chapter I, pp. 3-9, Sep. 24, 2002, Edition: 1.
Holley, K., "IBM Assessments for Service Oriented Architecture", 2004, pp. 1-15, IBM Corporation.
Inaganti, S., et al., "SOA Maturity Model", Apr. 2007, BPTrends, pp. 1-23, www.bptrends.com.
Proquest, "COBIT 4.0: Major Update to International Standard Helps Businesses Increase IT Value, Decrease Risk", PR Newswire Europe Including UK Disclose, Dec. 14, 2005, pp. 1-3, New York.
Veryard, R., "The Component-Based Business: Plug and Play", Springer-Verlog, London 2001, pp. 1-237, Practitioner series ISSN 1439-9245, ISBN 1-85233-361-8 Springer-Verlag London Berlin Heidelberg.
White, R., et. al. "How Computers Work", Que, Oct. 2003, pp. 1-65, 7th Edition.
IBM, Business Consulting Services, "Assessment for AllAmerica Service Oriented Architecture", Jun. 23, 2004, pp. 1-10, IBM Corporation.
IBM, Business Consulting Services, "AVIS Futures SOA Assessment IBM Assessments for Service Oriented Architecture", Jun. 29, 2004, pp. 1-36, IBM Corporation.
IBM, Business Consulting Services, "Establish SOA Center of Excellence & SOA Governance", 2004, pp. 1-30, IBM Corporation.
IBM, Business Consulting Services, "IBM Assessments for Service Oriented Architecture", 2004, pp. 1-17, IBM Corporation.
IBM, Business Consulting Services, "IBM Assessments for Service Oriented Architecture part 2—criteria and leading practices", 2004, pp. 1-35, IBM Corporation.
IBM, Business Consulting Services, "Establishing SOA CoE & Governance or Need to validate the asset name and the engagement model (scope) as defined asset", 2004, pp. 1-41, IBM Corporation.
IBM, Business Consulting Services, "IBM Strategy and Planning for Services Oriented Architecture", 2004, pp. 1-37, IBM Corporation.
PR Newswire, "Mercury Unveils BTO Strategy for Service Oriented Architecture", Oct. 9, 2006, pp. 1-6, Ulitzer, Inc., URL: http://zapthink.ulitzer.com/node/281920.
PRNewswire, TIBCO Software: "TIBCO Empowers Customers With New Model for Accelerating Business Process Mangement Success", Apr. 10, 2007, pp. 1-2, PRNewswire, Accessed Aug. 6, 2012, URL: http://www.prnewswire.com/news-releases/tibco-empowers-customers-with-new-model-for-accelerating-business-process-management-success-57980817.html.
Businesswire, "Research and Markets: Cost Reduction is the Key Long-Term Driver of SOA Adoption", Feb. 15, 2007, pp. 1-3, Accessed: Aug. 6, 2012, URL: http://www.businesswire.com/portal/site/google/index.jsp?ndmViewId=news_view&newsId=20070215005402&newsLang=en.
Office Action, U.S. Appl. No. 12/024,772, Apr. 1, 2009, pp. 1-12.
Final Office Action, U.S. Appl. No. 12/024,772, Jun. 10, 2010, pp. 1-15.
Office Action, U.S. Appl. No. 12/233,156, Nov. 15, 2010, pp. 1-15.
Office Action, U.S. Appl. No. 12/024,772, Jan. 22, 2010, pp. 1-55.

(56) References Cited

OTHER PUBLICATIONS

Notice of Allowance, U.S. Appl. No. 12/024,772, Jan. 31, 2011, pp. 1-20.
Office Action, U.S. Appl. No. 12/025,328, Apr. 11, 2011, pp. 1-19.
Final Office Action, U.S. Appl. No. 12/233,156, Apr. 18, 2011, pp. 1-41.
Office Action, U.S. Appl. No. 12/326,354, Jun. 8, 2011, pp. 1-18.
Office Action, U.S. Appl. No. 12/024,746, Jun. 10, 2011, pp. 1-45.
Office Action, U.S. Appl. No. 12/025,340, Jun. 13, 2011, pp. 1-58.
Office Action, U.S. Appl. No. 12/326,390, Jul. 19, 2011, pp. 1-90.
Office Action, U.S. Appl. No. 12/327,029, Sep. 21, 2011, pp. 1-58.
Office Action, U.S. Appl. No. 12/326,412, Sep. 26, 2011, pp. 1-109.
Final Office Action, U.S. Appl. No. 12/326,354, Oct. 11, 2011, pp. 1-19.
Final Office Action, U.S. Appl. No. 12/025,328, Nov. 14, 2011, pp. 1-27.
Final Office Action, U.S. Appl. No. 12/326,390, Jan. 20, 2012, pp. 1-18.
Final Office Action, U.S. Appl. No. 12/326,412, Mar. 26, 2012, pp. 1-26.
Final Office Action, U.S. Appl. No. 12/327,029, Apr. 6, 2012, pp. 1-111.
Notice of Allowance, U.S. Appl. No. 12/025,328, May 25, 2012, pp. 1-17.
Advisory Action, U.S. Appl. No. 12/327,029, Jun. 19, 2012.
Office Action, U.S. Appl. No. 12/882,662, Nov. 26, 2012.
Office Action, U.S. Appl. No. 13/572,670, Nov. 26, 2012.
Nicola M. Josuttis. "SOA in Practice", O'Reilly, Aug. 2007, First Edition.
Office Action, U.S. Appl. No. 12/882,571, Jan. 7, 2013.
Office Action , U.S. Appl. No. 12/882,607, Jan. 18, 2013.
Office Action, U.S. Appl. No. 12/882,745, Jan. 7, 2013.
Office Action, U.S. Appl. No. 12/882,774, Dec. 18, 2012.
Final Office Action, U.S. Appl. No. 13/572,670, Apr. 11, 2013.

* cited by examiner

DEFINING SERVICE OWNERSHIP FOR A SERVICE ORIENTED ARCHITECTURE

CROSS-REFERENCE TO RELATED APPLICATION

This application is a continuation application of and claims priority from U.S. patent application Ser. No. 12/025,328, filed on Feb. 4, 2008.

BACKGROUND OF THE INVENTION

1. Field of the Invention

The field of the invention is data processing, or, more specifically, methods and systems for defining service ownership for a Service Oriented Architecture ('SOA').

2. Description of Related Art

Service Oriented Architecture ('SOA') is an architectural style that guides all aspects of creating and using business processes, packaged as services, throughout their lifecycle, as well as defining and provisioning the IT ('information technology') infrastructure that allows different applications to exchange data and participate in business processes loosely coupled from the operating systems and programming languages underlying those applications. SOA represents a model in which functionality is decomposed into distinct units (services), which can be distributed over a network and can be combined together and reused to create business applications. These services communicate with each other by passing data from one service to another, or by coordinating an activity between two or more services. The concepts of Service Oriented Architecture are often seen as built upon, and the evolution of, the older concepts of distributed computing and modular programming. Although services and a business's SOA architecture are often strictly defined, governance of an SOA, implementation of an SOA, operation of an SOA, and management of an SOA is often not defined. A defined model of governance, however, may increase effectiveness and efficiency in implementing, operating, and managing a business's SOA, thereby providing savings to the business.

SUMMARY OF THE INVENTION

Methods and systems of defining service ownership for a Service Oriented Architecture ('SOA') are described that include defining, in response to an event requiring a change in service ownership and in dependence upon data describing business functions within a business, a service domain, including identifying a structure and scope for the service domain; reviewing, by a service domain ownership review board, the defined service domain for approval; upon approval of the defined service domain, identifying potential impact upon currently existing service domains caused by implementation of the defined service domain; identifying a potential owner of the defined service domain in dependence upon a service type of the defined service domain and funding requirements of the service domain; presenting, to relevant stakeholders in the business, the potential owner of the defined service domain for approval; and upon approval of the potential owner of the defined service domain, assigning the potential owner of the defined service domain responsibility for managing the defined service domain.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
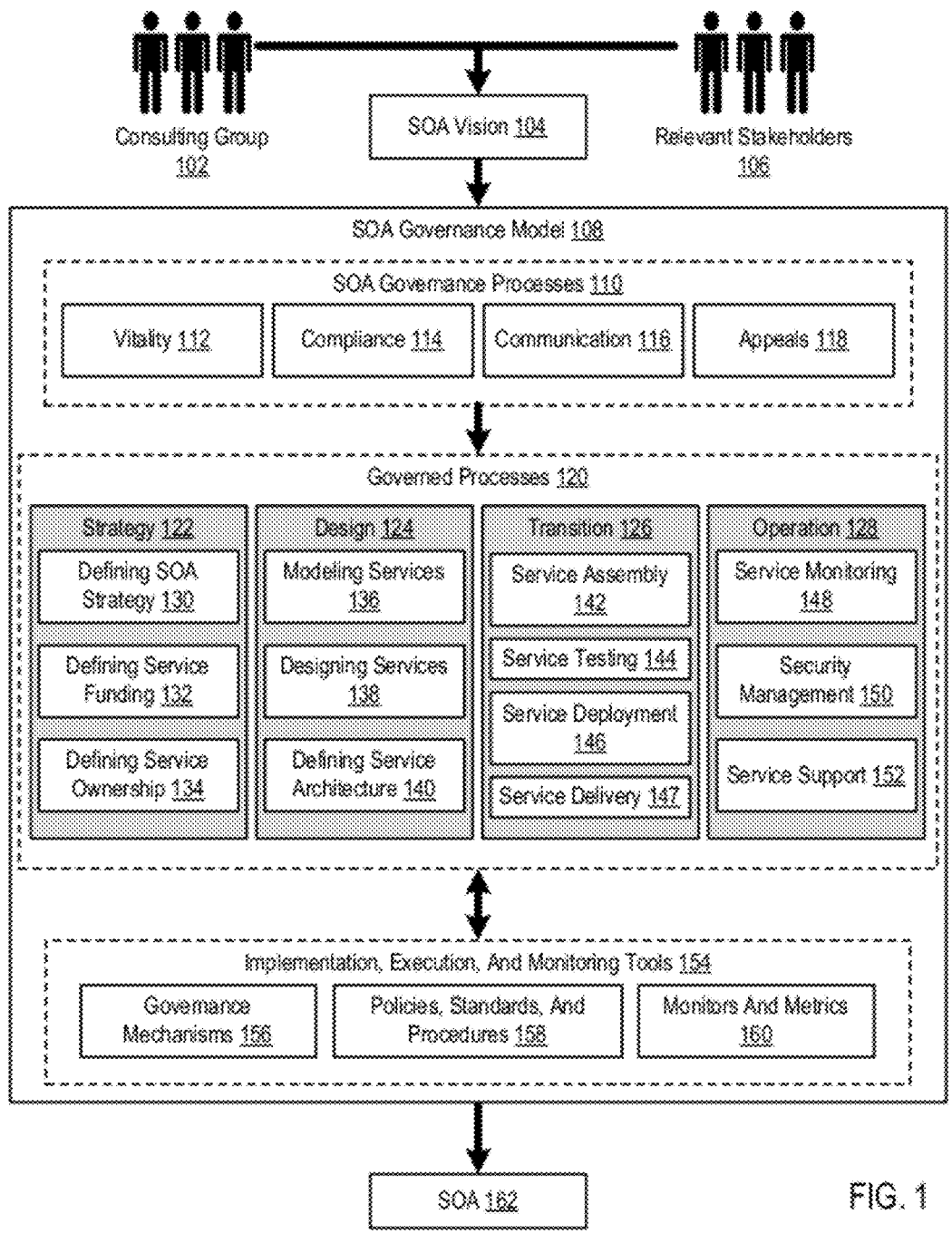
FIG. 1 sets forth a block diagram of a system for defining service ownership for an SOA according to embodiments of the present invention.

Exemplary methods and systems for defining service ownership for an SOA in accordance with the present invention are described with reference to the accompanying drawings, beginning with FIG. 1. FIG. 1 sets forth a block diagram of a system for governing a Service Oriented Architecture ('SOA') that includes a process of defining service ownership for an SOA according to embodiments of the present invention. SOA is an architectural style that guides all aspects of creating and using business processes, packaged as services, throughout their lifecycle, as well as defining and provisioning the information technology ('IT') infrastructure that allows different applications to exchange data and participate in business processes loosely coupled from the operating systems and programming languages underlying those applications. SOA represents a model in which functionality is decomposed into distinct units, called services, which can be distributed over a network, can be combined together, and reused to create business applications. These services communicate with each other by passing data from one service to another, or by coordinating an activity between two or more services. The concepts of Service Oriented Architecture are often seen as built upon, and the evolution of, the older concepts of distributed computing and modular programming.

The system of FIG. 1 includes an SOA governance model (108) that provides parameters used in governing a business's SOA, that is, a governed SOA (162). An SOA governance model may be established through use of a consulting group (102), using software tools and business artifacts, and relevant stakeholders (106) of a business. A consulting group may include one or more individuals that guide members of a business in establishing and implementing an SOA governance model. Such individuals typically are not members of the business. Consulting groups often work closely with relevant stakeholders of the business in establishing and implementing an SOA governance model.

A relevant stakeholder (106) of a business is an individual or party that affects, or can be affected by, a business's actions. "Relevant stakeholders," as the term is used in the specification, refers to stakeholders which are most directly affected by a business's actions with respect to SOA and often have decision making authority with regard to one or more aspects of the SOA governance model. Although only consulting groups and relevant stakeholders are described here with respect to implementing and operating a governance model in accordance with embodiments of the present invention, readers of skill in the art will immediately recognize that many other individuals or group of individuals associated with a business may take part in implementing and operating some or more aspects such a governance model and each such individual or group of individuals and their actions are also well within the scope of the present invention.

The exemplary SOA governance model (108) of FIG. 1 may be implemented and operated according to an SOA vision (104) that may be defined by the consulting (102) and the relevant stakeholders (106) of the business. That is, a consulting group may be used to guide relevant stakeholders through a process of identifying an SOA vision which may be used to define not only primary boundaries of the business's SOA, but also a governance model for the SOA. An SOA vision (104) is a general and broad definition of an SOA strategy to be accomplished through use of an SOA. An example of such an SOA strategy which may be accomplished through use of an SOA, is to reduce redundancy in the use of different software applications that provide similar functionality to different organizational entities of the business. Consider, for example, that a retail sales department and an online sales department use different software applications to provide the similar function of receiving and processing customer orders. An SOA vision may outline business goals of the SOA that may be implemented that reduce such redundancy by providing a single service of customer order receipt and processing to both the retail sales department and the online sales department of the business.

As mentioned above, an SOA governance model (108) provides parameters used in governing a business's governed SOA (162). The exemplary SOA governance model (108) of FIG. 1, for example, includes several SOA governance processes (110). An SOA governance process (110) is a processes that when executed governs one or more governed SOA processes (110), the governed processes typically used in implementing, operating, maintaining, and managing an SOA for a business. That is, the governance processes, when executed, effect governance of the typical implementation, operation, maintenance, and management of an SOA for a business.

The exemplary SOA governance model (108) of FIG. 1 the SOA includes a vitality (112) governance processes, a compliance (114) governance process, a communication (116) governance processes, and an appeals (118) governance process. The vitality (112) governance process maintains the applicability of the SOA governance model. The vitality process ensures that the governance model is current, reflecting current business and information technology and strategy, and also refines other governance processes and governance mechanisms to ensure continued usage and relevance of the governance model.

The compliance (114) governance process governs the review and approval processes used in implementing and managing services within an SOA. The governance processes includes providing criteria defined in the establishment of an SOA governance model to guide such review and approval processes. Such criteria may include a business's principles, standards, defined business roles, and responsibilities associated with those defined business roles.

The communication (116) governance process governs communication of SOA vision, SOA plans, and the SOA governance model to members of the business for educating such members. The communication governance process ensures that governance is acknowledged and understood throughout a business and also provides, to members of the business, environments and tools for easy access and use of information describing an SOA governance model.

The appeals (118) governance process enables members of a business to appeal SOA decisions. This appeals governance process therefore also provides exceptions to business policies, information technology policies, and other criteria that must typically be met within SOA decision-making processes.

As mentioned above, each of the governance processes when executed governs one or more governed processes. A governed process is a processes used in implementing, operating, maintaining, and managing an SOA for a business. The exemplary SOA governance model (108) of FIG. 1 includes categories of governed processes (122, 124, 126, 128). Each category represents an area of SOA implementation, operation, maintenance, and management carried out by the governed processes included in the category.

The categories of governed processes in the example of FIG. 1 include strategy (122), design (124), transition (126), and operation (128). Processes included in the category of strategy (122) generally carry out an initial planning of service implementation. Examples of governed processes included in the category of strategy include a process for defining SOA strategy (130), defining service funding (132), and defining service ownership (134). Processes included in the category of design (124) generally carry out identification and definition of particular services for an SOA. Examples of governed processes included in the category of design include a process for modeling services (136), designing services (138), and defining service architecture (140). Processes included in the category of transition (126) generally carry out implementation of services in an SOA. Examples of governed processes included in the category of transition (126) include a process for service assembly (142), service testing (144), service deployment (146), and service delivery (147). Processes included in the category of operation (128) generally carry out management and monitoring of services operating within an SOA. Examples of governed processes included in the category of operation (128) include a process for service monitoring (148), security management (150), and service support (152).

The SOA governance processes (110) of FIG. 1 are executed and implemented by one or more implementation, execution and monitoring tools (154). Such implementation tools may include governance mechanisms (156). Governance mechanisms (156) may include one or more individuals, organizational entities, and business infrastructure to carry out governance according to the governance model (108). Such individuals may include relevant stakeholders, committees, or boards responsible for carrying out such governance. Organizational entities may include, for example, a board of directors, management groups, departments within a business, and the like. Business infrastructure may include available human labor, software applications, database management systems, computer technology, funding, and other types of business infrastructure as will occur to those of skill in the art. Different governance mechanisms (156) may be responsible for carrying out governance of different categories (122,124,126,128) of governed processes (120).

Other exemplary implementation and execution tools (154) in the exemplary system of FIG. 1 include policies, standards, and procedures (158). Policies, standards, and procedures (158) are embodiments of a business's overall business principles and are typically used in guiding decision-making in many of the governed processes (120). That is, policies, standards, and procedures (158) are compliance requirements, defined according to the business's SOA.

Other exemplary implementation, execution, and monitoring tools (154) in the exemplary system of FIG. 1 include monitors and metrics (160). Monitors are typically used to gather data describing performance of governed processes (120) and SOA governance processes (110). The data describing performance of governed processes and SOA governance processes may be compared to specified metrics in order to determine whether the performance of the governed processes and SOA governance processes is weak or strong. The metrics may also be used to identify particular steps of governed processes (120) and SOA governance processes (110) are ripe for improvement. As such monitors and metrics may be used to increase the efficiency and overall effectiveness of not only the governed processes typically used in implementing, operating, maintaining, and managing an SOA (162), but may also be used to increase the efficiency and overall effectiveness of the SOA governance processes (110) that govern such governed processes (120).

The arrangement of governance processes, governed processes, implementation and execution tools making up the exemplary system illustrated in FIG. 1 are for explanation, not for limitation. Systems useful according to various embodiments of the present invention may include additional computer technology, software applications, servers, routers, devices, architectures, organizational entities, and business members not shown in FIG. 1, as will occur to those of skill in the art. Networks in such systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms.

As mentioned above with respect to FIG. 1, an SOA governance model includes several SOA processes that are governed by several SOA governance processes. These SOA processes, so-called governed processes are used in implementing, operating, maintaining, and managing an SOA for a business. The remaining figures in this specification describe in detail various embodiments of one exemplary governed process used in governing an SOA in accordance with an SOA governance model. For further explanation, therefore, FIG. 2 sets forth a flow chart illustrating an exemplary method for defining service ownership for an SOA according to embodiments of the present invention.

Figure 2:
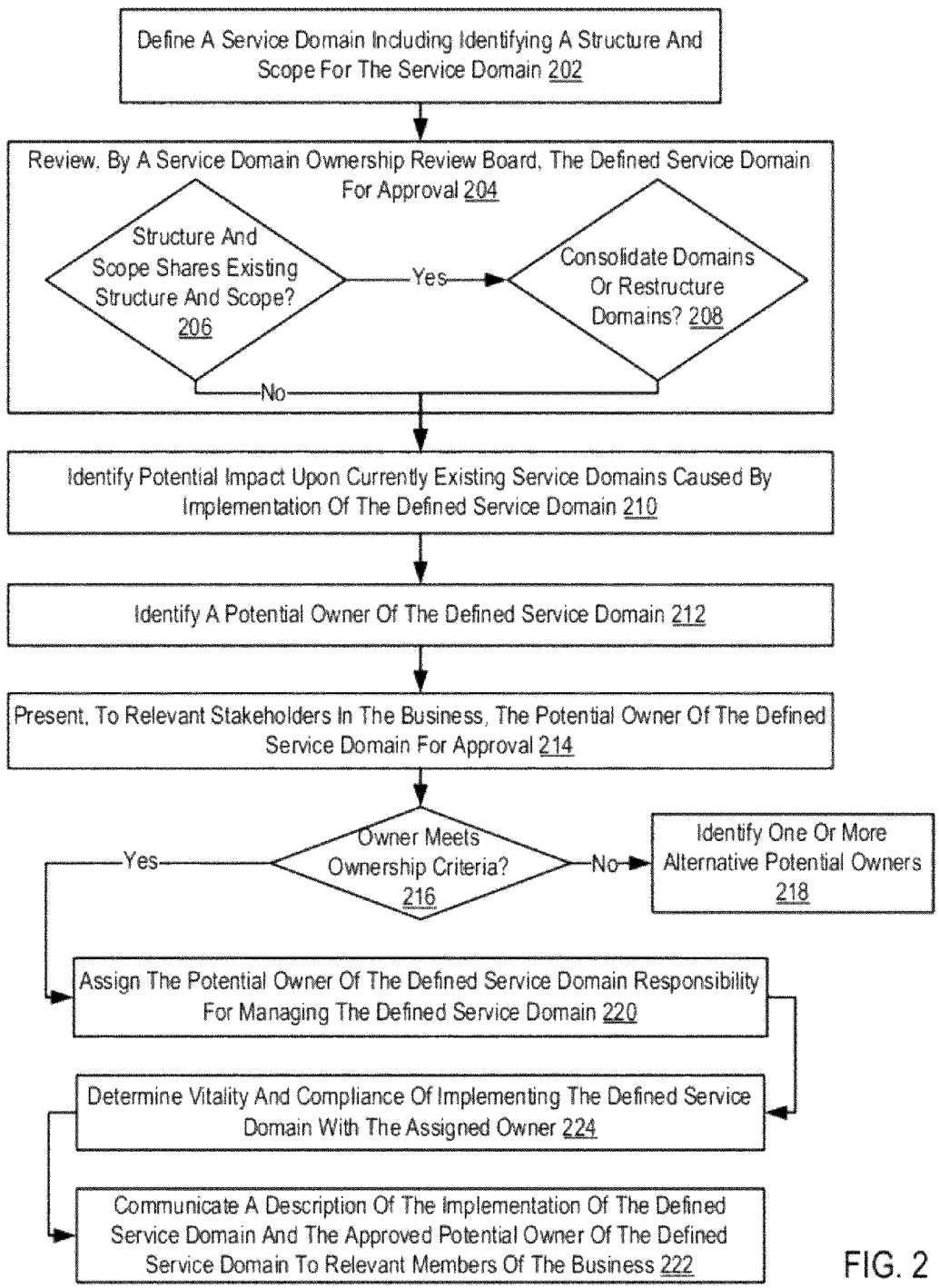
FIG. 2 sets forth a flow chart illustrating an exemplary method for defining service ownership for an SOA according to embodiments of the present invention.

The method of FIG. 2 is carried out in response to an event requiring a change in service ownership. Examples of events requiring a change in service ownership include a decision to create a new service domain, a decision to create a new service, and so on as will occur to those of skill in the art. Service ownership generally refers to the process of establishing an owner for a service domain. An owner of a service domain is an individual or a group assigned the responsibility of administering services within that particular service domain. Such an owner may be one or more business members or business entities. A service domain is a domain, defined according to an overall SOA strategy of the business, which includes a set of services that share similar characteristics. Such characteristics may include information technology infrastructure required to operate the services, software-application infrastructure used in operating the services, typical users of the services, groups having expertise associated with the services, and so on as will occur to those of skill in the art.

The method of FIG. 2 includes defining (202), in dependence upon data describing business functions within a business, a service domain. Data describing business functions within a business may include, for example, a business model, an industry model, a service-oriented modeling and architecture model, and a currently existing service domain ownership model. In the method of FIG. 2, defining (202) a service domain includes identifying a structure and scope for the service domain. The structure and scope of the service domain identifies the business and information technology infrastructure used to operate services within the service domain and identifies the set of services included in the service domain. Defining (202), in dependence upon data describing business functions within a business, a service domain may be carried out by one or more business members, typically working with a consulting group, through use of various technological tools such as computers, software applications, web servers, spreadsheets, databases, networks, aggregations of software and hardware, and other tools as will occur to those of skill in the art.

The method of FIG. 2 also includes reviewing (204), by a service domain ownership review board, the defined service domain for approval. A service domain ownership review board may include one or more business members assigned the responsibility of approving service domains for the business's SOA. In the method of FIG. 2, reviewing (204), by a service domain ownership review board, the defined service domain for approval includes determining (206) whether the structure and scope of the defined service domain shares any structure or scope with a currently existing service domain and if the defined structure and scope of the defined service domain shares any structure or scope of the currently existing service domain, and determining (208) whether to consolidate the currently existing service domain and the defined service domain or restructure the currently existing service domain. In some cases a newly defined service domain may share some structure or scope with a currently existing service domain. That is, the newly defined service domain may have structure or scope which overlaps structure or scope of other currently existing service domains. Consider, for example, a newly defined service domain that includes services that provide the function of processing payments and a currently existing service domain that includes services that provide the function of customer service including processing refunds. The newly defined service domain may share a common scope and structure with the currently existing service domain in that both domains may provide a function for processing refunds of payments in some form. When the defined structure and scope of the defined service domain shares any structure or scope of the currently existing service domain, the defined service domain and the currently existing service domain may be consolidated into a single service or the currently existing service domain may be restructured such that the defined service domain no longer shares any structure and scope with the currently existing service domain.

If a decision is made neither to consolidate the currently existing service domain and the defined service domain nor restructure the currently existing service domain, the decision may be appealed to an appeals board. An appeals board is one or more business members assigned the responsibility of determining whether a previous decision not to consolidate or split an existing service domain should be upheld or overturned. That is, the appeals board may provide exceptions to a negative decisions. The appeals board may overturn the previous decision by providing an alternative to consolidate or splitting a currently existing service domain, or in the alternative, mandate that such consolidation or split be made.

Upon approval of the defined service domain, the method of FIG. 2 continues by identifying (210) potential impact upon currently existing service domains caused by implementation of the defined service domain. When defining a new service domain in businesses having other currently existing service domains, operation of the newly defined service domain may require assets, business members, business and IT infrastructure, and the like, that were previously used by currently existing service domains. Such an impact on assets available to the operation of currently existing service domain may negatively impact the overall effectiveness of the business's SOA if not managed properly.

The method of FIG. 2 also includes identifying (212) a potential owner of the defined service domain in dependence upon a service type of the defined service domain and funding requirements of the service domain. Identifying (212) a potential owner of the defined service domain may be carried out by nominating by one or more individuals, candidates, either a single individual or group of individuals, as potential owners. Potential owners may be identified according to service type and funding requirements of the service domain. Such qualified potential owners of a service domain may be required to have expertise in services of the type included in the newly defined service domain and may be required to administer funding for services included in the newly defined service domain, regardless of the funding source or funding model.

The method of FIG. 2 also includes presenting (214), to relevant stakeholders in the business, the potential owner of the defined service domain for approval, determining (216) by the relevant stakeholders whether the potential owner meets ownership criteria, and if the potential owner does not meet the ownership criteria, identifying (218) one or more alternative potential owners. Presenting (214), to relevant stakeholders in the business, the potential owner of the defined service domain for approval may be carried out by providing the relevant stakeholders with a description of the service domain for which the potential owner may become owner and a description of the potential owner, the owner's responsibilities, capabilities, and available assets for owning the service domain. The relevant stakeholders may then determine (216) whether the potential owner meets ownership criteria by comparing the descriptions of the service domain and potential owner to predefined ownership criteria. Ownership criteria are criteria defined by relevant stakeholders used to determine whether a potential owner should be implemented for a particular service domain. Such criteria may include, for example, an amount of assets required to manage a service domain, a required business infrastructure required to manage the service domain, a required IT infrastructure required to manage the service domain, and so on as will occur to those of skill in the art. If the potential owner does not meet the ownership criteria, one or more alternative potential owners may then be identified and the process for approving the potential owners may be repeated. This process may be repeated until a potential owner is approved.

If the potential owner does not meet the ownership criteria and no alternative potential owners is identified, the original decision regarding the potential owner meeting the ownership criteria may be appealed to an appeals board. The appeals board determines whether the potential owner in fact does not meet the ownership criteria, and even if the potential owner does not meet the ownership criteria, the appeals board determines whether to a grant an exception to the potential owner. If the exception is granted, the potential owner is considered approved by relevant stakeholders and the method continues by updating the service domain ownership model with the approved owner.

Upon approval of the potential owner of the defined service domain, the method of FIG. 2 continues by assigning (220) the potential owner of the defined service domain responsibility for managing the defined service domain. Assigning (220) the potential owner of the defined service domain responsibility for managing the defined service domain may be carried out by updating a service domain ownership model to reflect an association of the defined service domain and the potential owner. A service domain ownership model typically includes associations of service domains and owners.

The method of FIG. 2 also includes determining (224) vitality and compliance of implementing the defined service domain with the assigned owner. Determining vitality of implementing the defined service domain with the assigned owner may be carried out by determining whether business, information technology, human, and other infrastructure exists and is available that is necessary to implement the defined service domain with the assigned owner. Determining compliance of the implementing the defined service domain with the assigned owner may be carried out by determining whether the implementation of the defined service domain and assignment of the assigned owner complies with predefined SOA policies. Such policies are predefined by one or more members of the business, typically working with a consulting group, and generally include rules that govern SOA process, including, for example, the SOA process of defining service ownership If a decision is made that implementing the defined service domain with the assigned owner is not compliant or not vital, the decision may be appealed to a steering committee. A steering committee is one or more business members assigned the responsibility of determining whether one or more decision by other groups, such as an appeals board, should be upheld.

The method of FIG. 2 also includes communicating (222) a description of the implementation of the defined service domain and the approved potential owner of the defined service domain to relevant members of the business. Communicating (222) a description of the implementation of the defined service domain and the approved potential owner of the defined service domain to relevant members of the business may be carried out by tailoring, for communication in dependence upon classifications of the relevant members of the business, the description of the implementation of the defined service domain and the approved potential owner of the defined service domain. That is, different members of the business may be classified differently and may therefore require different descriptions of the implementation of the defined service domain and the approved potential owner of the defined service domain. The chief executive officer of a business for example may require a different description of the implementation of the defined service domain and the approved potential owner of the defined service domain than that required by an information technology manager due to the business roles which each member provides.

From time to time the method of FIG. 2, that is, the method of defining service ownership for an SOA, may be improved. Such improvement is enabled by gathering metrics describing effectiveness of one or more steps of method of defining service ownership for an SOA. These metrics may be used by relevant business members to identify areas of the method where improvement may be made. Then the relevant business members may modify, in dependence upon the gathered metrics, the method of defining service ownership for an SOA, thereby improving the overall effectiveness of the method.

Figure 3:
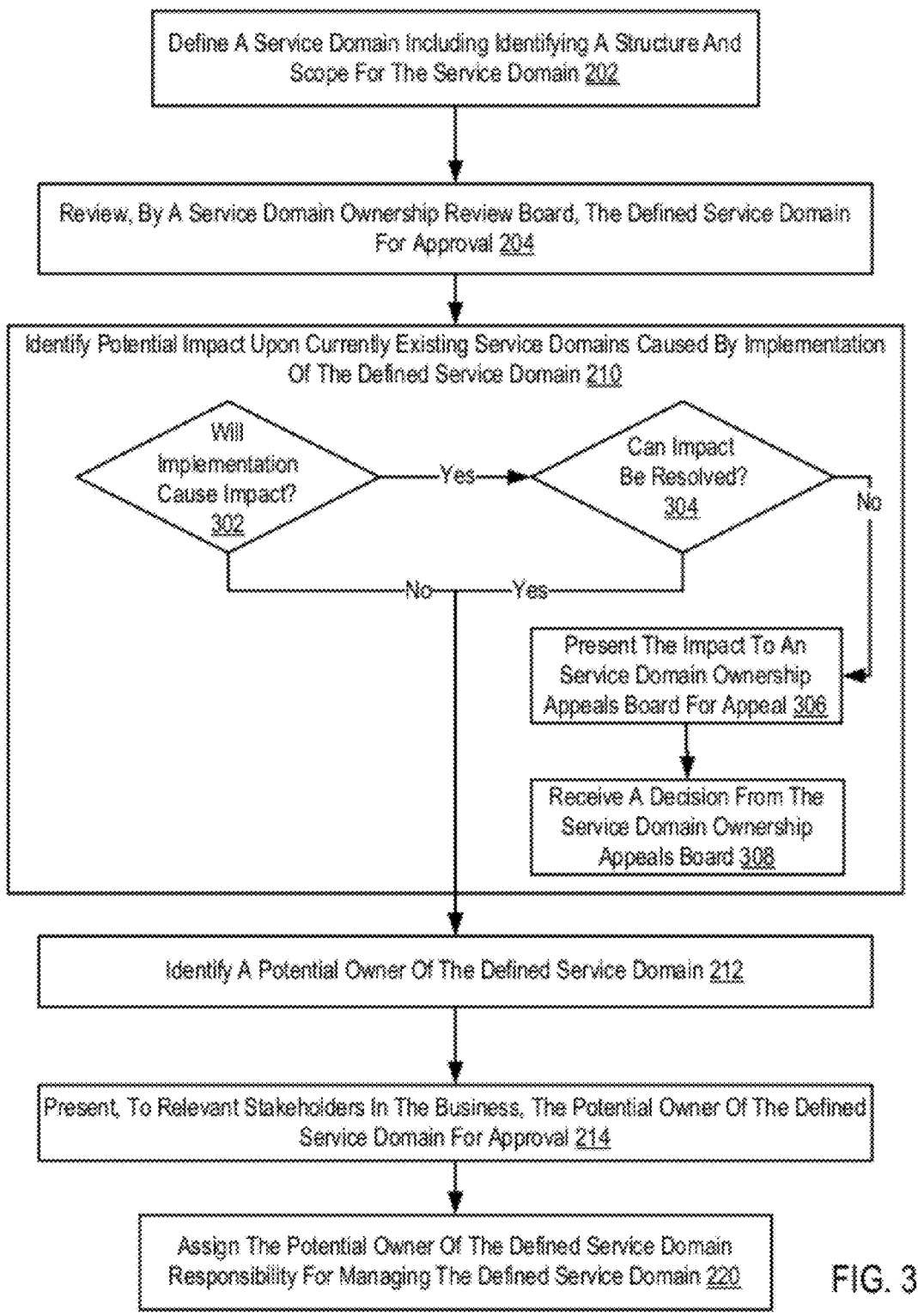
FIG. 3 sets forth a flow chart illustrating a further exemplary method for defining service ownership for an SOA according to embodiments of the present invention.

For further explanation, FIG. 3 sets forth a flow chart illustrating a further exemplary method for defining service ownership for an SOA according to embodiments of the present invention. The method of FIG. 3 is similar to the method of FIG. 2 in that the method of FIG. 3 also includes: defining (202), in dependence upon data describing business functions within a business, a service domain, including identifying a structure and scope for the service domain; reviewing (204), by a service domain ownership review board, the defined service domain for approval; upon approval of the defined service domain, identifying (210) potential impact upon currently existing service domains caused by implementation of the defined service domain; identifying (212) a potential owner of the defined service domain in dependence upon a service type of the defined service domain and funding requirements of the service domain; presenting (214), to relevant stakeholders in the business, the potential owner of the defined service domain for approval; and upon approval of the potential owner of the defined service domain, assigning (220) the potential owner of the defined service domain responsibility for managing the defined service domain.

The method of FIG. 3 differs from the method of FIG. 2, however, in that in the method of FIG. 3, identifying (210) potential impact upon currently existing service domains caused by implementation of the defined service domain includes determining (302) whether implementation of the defined service domain will cause an impact on currently existing service domains. As mentioned above, when defining a new service domain in businesses having other currently existing service domains, operation of the newly defined service domain may require assets, business members, business and IT infrastructure, and the like, that were previously used by currently existing service domains. Such an impact on assets available to the operation of currently existing service domain may negatively impact the overall effectiveness of the business's SOA if not managed properly. If implementation of the defined service domain will cause an impact on currently existing service domains, the method of FIG. 3 continues by determining (304) whether the impact on currently existing service domains is capable of being resolved. Impact on currently existing service domains may be carried out in various ways in accordance with the type of impact that will occur. Consider for example that the newly defined service domain will impact a currently existing service domain in that the newly defined service domain requires existing information technology assets originally used by the currently existing service domain. Such an impact may be resolved by acquiring, by the business, additional information technology assets or by changing the scope and structure of either domain.

If the impact on currently existing service domains is not capable of being resolved, then the method of FIG. 3 continues by identifying (212) a potential owner of the defined service domain as described above in detail with respect to FIG. 2. If the impact on currently existing service domains is not capable of being resolved, however, the method of FIG. 3 continues by presenting (306) the impact to a service domain ownership appeals board for appeal and receiving (308) a decision from the service domain ownership appeals board. A service domain ownership appeals board is any group of business members assigned the responsibility for handling appeals of impacts caused by implementation of newly defined service domains which cannot be resolved.

The appeals board may provide, through an opinion, an exception to the typical policies that govern implementing a new service domain. If the opinion of the appeals board does provide such an exception the method of FIG. 3 continues by identifying (212) a potential owner of the defined service domain as described in detail above with respect to FIG. 2. If the opinion of the appeals board does not provide such an exception, the opinion of the appeals board may be reviewed by a steering committee. A steering committee is one or more business members assigned the responsibility of determining whether one or more decision by other groups, such as an appeals board, should be upheld.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method of defining service ownership for a Service Oriented Architecture ('SOA'), the method carried out in response to an event requiring a change in service ownership, the method comprising:

defining, by the computer, in dependence upon data describing business functions within a business, a service domain, including identifying a structure and scope for the service domain, wherein the structure and scope of the service domain identifies the business and information technology infrastructure used to operate services within the service domain and identifies the set of services included in the service domain;

identifying, by the computer, a potential impact upon currently existing service domains caused by implementation of the defined service domain wherein identifying by the computer potential impact upon currently existing service domains caused by implementation of the defined service domain further comprises:

determining, by the computer, whether implementation of the defined service domain will cause an impact on currently existing service domains; and in response to determining that implementation of the defined service domain will cause an impact on currently existing service domains:

determining by the computer whether the impact on currently existing service domains is capable of being resolved;

in response to determining that the impact on currently existing service domains is not capable of being resolved, presenting by the computer the impact to a service domain ownership appeals board for appeal; and receiving by the computer a decision from the service domain ownership appeals board; and identifying, by the computer, a potential owner of the defined service domain in dependence upon a service type of the defined service domain and funding requirements of the service domain;

presenting, by the computer, the potential owner of the defined service domain for approval; and determining by the relevant stakeholders whether the potential owner meets ownership criteria;

in response to determining that the potential owner does not meet ownership criteria, identifying, by the computer, one or more alternative potential owners; and upon approval of the potential owner of the defined service domain, assigning, by the computer, the potential owner of the defined service domain responsibility for managing the defined service domain.

2. The method of claim 1 wherein the event requiring a change in service ownership comprises a decision to create a new service domain.

3. The method of claim 1 wherein the event requiring a change in service ownership comprises a decision to create a new service.

4. The method of claim 1 further comprising:
communicating, by the computer, a description of the implementation of the defined service domain and the approved potential owner of the defined service domain to relevant members of the business.

5. The method of claim 4 wherein communicating by the computer a description of the implementation of the defined service domain and the approved potential owner of the defined service domain to relevant members of the business further comprises:
tailoring, by the computer, for communication in dependence upon classifications of the relevant members of the business, the description of the implementation of the defined service domain and the approved potential owner of the defined service domain.

6. The method of claim 1 further comprising:
gathering, by the computer, metrics describing effectiveness of one or more steps of method of defining service ownership for an SOA; and
modifying, by the computer, in dependence upon the gathered metrics, the method of defining service ownership for an SOA.

7. A system of defining service ownership for a Service Oriented Architecture ('SOA'), the system including a computer processor and computer memory, the computer memory including computer program instructions that, when executed by the computer processor, cause the system to carry out the steps of:
defining, in dependence upon data describing business functions within a business, a service domain, including identifying a structure and scope for the service domain, wherein the structure and scope of the service domain identifies the business and information technology infrastructure used to operate services within the service domain and identifies the set of services included in the service domain;
identifying, by the computer, a potential impact upon currently existing service domains caused by implementation of the defined service domain wherein identifying by the computer potential impact upon currently existing service domains caused by implementation of the defined service domain further comprises:
determining, by the computer, whether implementation of the defined service domain will cause an impact on currently existing service domains; and
in response to determining that implementation of the defined service domain will cause an impact on currently existing service domains:
determining, by the computer, whether the impact on currently existing service domains is capable of being resolved;
in response to determining that the impact on currently existing service domains is not capable of being resolved, presenting, by the computer, the impact to a service domain ownership appeals board for appeal; and
receiving, by the computer, a decision from the service domain ownership appeals board; and
identifying, by the computer, a potential owner of the defined service domain in dependence upon a service type of the defined service domain and funding requirements of the service domain;
presenting the potential owner of the defined service domain for approval;
determining, after presenting the potential owner of the defined service domain for approval, whether the potential owner meets ownership criteria;
in response to determining that the potential owner does not meet ownership criteria, identifying one or more alternative potential owners; and
assigning, upon approval of the potential owner of the defined service domain, the potential owner of the defined service domain responsibility for managing the defined service domain.

8. The system of claim 7 wherein the event requiring a change in service ownership comprises a decision to create a new service domain.

9. The system of claim 7 wherein the event requiring a change in service ownership comprises a decision to create a new service.

10. The system of claim 7 wherein the computer memory includes computer program instructions that, when executed by the computer processor, cause the system to carry out the step of:
communicating a description of the implementation of the defined service domain and the approved potential owner of the defined service domain to relevant members of the business.

11. The system of claim 10 wherein communicating a description of the implementation of the defined service domain and the approved potential owner of the defined service domain to relevant members of the business includes:
tailoring, for communication in dependence upon classifications of the relevant members of the business, the description of the implementation of the defined service domain and the approved potential owner of the defined service domain.

12. The system of claim 7 wherein the computer memory includes computer program instructions that, when executed by the computer processor, cause the system to carry out the steps of:
gathering metrics describing effectiveness of one or more steps of system of defining service ownership for an SOA; and
modifying, in dependence upon the gathered metrics, the system of defining service ownership for an SOA.

* * * * *